United States Patent
Yasumori et al.

(10) Patent No.: US 9,093,100 B2
(45) Date of Patent: Jul. 28, 2015

(54) MAGNETIC RECORDING MEDIUM INCLUDING TAILORED EXCHANGE COUPLING LAYER AND MANUFACTURING METHOD OF THE SAME

(71) Applicant: WD Media (Singapore) PTE. LTD., Irvine, CA (US)

(72) Inventors: Junichi Yasumori, Tokyo (JP); Yoshiaki Sonobe, Tokyo (JP)

(73) Assignee: WD Media (Singapore) Pte. Ltd., Singapore (SG)

( * ) Notice: Subject to any disclaimer, the term of this patent is extended or adjusted under 35 U.S.C. 154(b) by 140 days.

(21) Appl. No.: 13/849,176

(22) Filed: Mar. 22, 2013

(65) Prior Publication Data

US 2013/0216865 A1 Aug. 22, 2013

Related U.S. Application Data

(62) Division of application No. 12/745,194, filed as application No. PCT/JP2009/054395 on Mar. 9, 2009, now Pat. No. 8,414,966.

(30) Foreign Application Priority Data

Mar. 17, 2008 (JP) ................................ 2008-067028

(51) Int. Cl.
  G11B 5/66 (2006.01)
  G11B 5/65 (2006.01)
  G11B 5/85 (2006.01)

(52) U.S. Cl.
  CPC .. *G11B 5/66* (2013.01); *G11B 5/65* (2013.01); *G11B 5/85* (2013.01)

(58) Field of Classification Search
  None
  See application file for complete search history.

(56) References Cited

U.S. PATENT DOCUMENTS

| | | | |
|---|---|---|---|
| 6,013,161 A | 1/2000 | Chen et al. |
| 6,063,248 A | 5/2000 | Bourez et al. |
| 6,068,891 A | 5/2000 | O'Dell et al. |
| 6,086,730 A | 7/2000 | Liu et al. |
| 6,099,981 A | 8/2000 | Nishimori |
| 6,103,404 A | 8/2000 | Ross et al. |
| 6,117,499 A | 9/2000 | Wong et al. |
| 6,136,403 A | 10/2000 | Prabhakara et al. |

(Continued)

FOREIGN PATENT DOCUMENTS

| JP | 1-243234 A | 9/1989 |
|---|---|---|
| JP | 2-240829 A | 9/1990 |

(Continued)

OTHER PUBLICATIONS

JP 08-069641 A English language abstract (1996 publication).*

(Continued)

*Primary Examiner* — Kevin Bernatz

(57) ABSTRACT

A magnetic recording medium enabling excellent magnetic recording reproduction characteristics to be exhibited with the spacing loss reduced. The magnetic recording medium has a magnetic recording layer of a granular structure having nonmagnetic boundary portions between pillar-shaped magnetic particles on a nonmagnetic substrate, and an exchange coupling layer provided on the magnetic recording layer to add an action of exchange coupling the magnetic particles. Ion irradiation on the entire surface of the exchange coupling layer after layering the exchange coupling layer on the magnetic recording layer is performed.

7 Claims, 4 Drawing Sheets

(56) References Cited

U.S. PATENT DOCUMENTS

| | | | |
|---|---|---|---|
| 6,143,375 A | 11/2000 | Ross et al. | |
| 6,145,849 A | 11/2000 | Bae et al. | |
| 6,146,737 A | 11/2000 | Malhotra et al. | |
| 6,149,696 A | 11/2000 | Jia | |
| 6,150,015 A | 11/2000 | Bertero et al. | |
| 6,156,404 A | 12/2000 | Ross et al. | |
| 6,159,076 A | 12/2000 | Sun et al. | |
| 6,164,118 A | 12/2000 | Suzuki et al. | |
| 6,200,441 B1 | 3/2001 | Gornicki et al. | |
| 6,204,995 B1 | 3/2001 | Hokkyo et al. | |
| 6,206,765 B1 | 3/2001 | Sanders et al. | |
| 6,210,819 B1 | 4/2001 | Lal et al. | |
| 6,216,709 B1 | 4/2001 | Fung et al. | |
| 6,221,119 B1 | 4/2001 | Homola | |
| 6,248,395 B1 | 6/2001 | Homola et al. | |
| 6,261,681 B1 | 7/2001 | Suekane et al. | |
| 6,270,885 B1 | 8/2001 | Hokkyo et al. | |
| 6,274,063 B1 | 8/2001 | Li et al. | |
| 6,283,838 B1 | 9/2001 | Blake et al. | |
| 6,287,429 B1 | 9/2001 | Moroishi et al. | |
| 6,290,573 B1 | 9/2001 | Suzuki | |
| 6,299,947 B1 | 10/2001 | Suzuki et al. | |
| 6,303,217 B1 | 10/2001 | Malhotra et al. | |
| 6,309,765 B1 | 10/2001 | Suekane et al. | |
| 6,358,636 B1 | 3/2002 | Yang et al. | |
| 6,362,452 B1 | 3/2002 | Suzuki et al. | |
| 6,363,599 B1 | 4/2002 | Bajorek | |
| 6,365,012 B1 | 4/2002 | Sato et al. | |
| 6,381,090 B1 | 4/2002 | Suzuki et al. | |
| 6,381,092 B1 | 4/2002 | Suzuki | |
| 6,387,483 B1 | 5/2002 | Hokkyo et al. | |
| 6,391,213 B1 | 5/2002 | Homola | |
| 6,391,430 B1 | 5/2002 | Fullerton et al. | |
| 6,395,349 B1 | 5/2002 | Salamon | |
| 6,403,919 B1 | 6/2002 | Salamon | |
| 6,408,677 B1 | 6/2002 | Suzuki | |
| 6,426,157 B1 | 7/2002 | Hokkyo et al. | |
| 6,429,984 B1 | 8/2002 | Alex | |
| 6,468,670 B1 | 10/2002 | Ikeda et al. | |
| 6,482,330 B1 | 11/2002 | Bajorek | |
| 6,482,505 B1 | 11/2002 | Bertero et al. | |
| 6,500,567 B1 | 12/2002 | Bertero et al. | |
| 6,528,124 B1 | 3/2003 | Nguyen | |
| 6,548,821 B1 | 4/2003 | Treves et al. | |
| 6,552,871 B2 | 4/2003 | Suzuki et al. | |
| 6,565,719 B1 | 5/2003 | Lairson et al. | |
| 6,566,674 B1 | 5/2003 | Treves et al. | |
| 6,571,806 B2 | 6/2003 | Rosano et al. | |
| 6,628,466 B2 | 9/2003 | Alex | |
| 6,664,503 B1 | 12/2003 | Hsieh et al. | |
| 6,670,055 B2 | 12/2003 | Tomiyasu et al. | |
| 6,682,807 B2 | 1/2004 | Lairson et al. | |
| 6,683,754 B2 | 1/2004 | Suzuki et al. | |
| 6,723,458 B2 * | 4/2004 | Shimizu et al. | 428/832.2 |
| 6,730,420 B1 | 5/2004 | Bertero et al. | |
| 6,743,528 B2 | 6/2004 | Suekane et al. | |
| 6,759,138 B2 | 7/2004 | Tomiyasu et al. | |
| 6,778,353 B1 | 8/2004 | Harper | |
| 6,795,274 B1 | 9/2004 | Hsieh et al. | |
| 6,855,232 B2 | 2/2005 | Jairson et al. | |
| 6,857,937 B2 | 2/2005 | Bajorek | |
| 6,893,748 B2 | 5/2005 | Bertero et al. | |
| 6,899,959 B2 | 5/2005 | Bertero et al. | |
| 6,916,558 B2 | 7/2005 | Umezawa et al. | |
| 6,939,120 B1 | 9/2005 | Harper | |
| 6,946,191 B2 | 9/2005 | Morikawa et al. | |
| 6,967,798 B2 | 11/2005 | Homola et al. | |
| 6,972,135 B2 | 12/2005 | Homola | |
| 7,004,827 B1 | 2/2006 | Suzuki et al. | |
| 7,006,323 B1 | 2/2006 | Suzuki | |
| 7,016,154 B2 | 3/2006 | Nishihira | |
| 7,019,924 B2 | 3/2006 | McNeil et al. | |
| 7,045,215 B2 | 5/2006 | Shimokawa | |
| 7,070,870 B2 | 7/2006 | Bertero et al. | |
| 7,090,934 B2 | 8/2006 | Hokkyo et al. | |
| 7,099,112 B1 | 8/2006 | Harper | |
| 7,105,241 B2 | 9/2006 | Shimokawa et al. | |
| 7,119,990 B2 | 10/2006 | Bajorek et al. | |
| 7,147,790 B2 | 12/2006 | Wachenschwanz et al. | |
| 7,161,753 B2 | 1/2007 | Wachenschwanz et al. | |
| 7,166,319 B2 | 1/2007 | Ishiyama | |
| 7,166,374 B2 | 1/2007 | Suekane et al. | |
| 7,169,487 B2 | 1/2007 | Kawai et al. | |
| 7,174,775 B2 | 2/2007 | Ishiyama | |
| 7,179,549 B2 | 2/2007 | Malhotra et al. | |
| 7,184,139 B2 | 2/2007 | Treves et al. | |
| 7,196,860 B2 | 3/2007 | Alex | |
| 7,199,977 B2 | 4/2007 | Suzuki et al. | |
| 7,208,236 B2 | 4/2007 | Morikawa et al. | |
| 7,220,500 B1 | 5/2007 | Tomiyasu et al. | |
| 7,229,266 B2 | 6/2007 | Harper | |
| 7,239,970 B2 | 7/2007 | Treves et al. | |
| 7,252,897 B2 | 8/2007 | Shimokawa et al. | |
| 7,277,254 B2 | 10/2007 | Shimokawa et al. | |
| 7,281,920 B2 | 10/2007 | Homola et al. | |
| 7,292,329 B2 | 11/2007 | Treves et al. | |
| 7,301,726 B1 | 11/2007 | Suzuki | |
| 7,302,148 B2 | 11/2007 | Treves et al. | |
| 7,305,119 B2 | 12/2007 | Treves et al. | |
| 7,314,404 B2 | 1/2008 | Singh et al. | |
| 7,320,584 B1 | 1/2008 | Harper et al. | |
| 7,329,114 B2 | 2/2008 | Harper et al. | |
| 7,375,362 B2 | 5/2008 | Treves et al. | |
| 7,420,886 B2 | 9/2008 | Tomiyasu et al. | |
| 7,425,719 B2 | 9/2008 | Treves et al. | |
| 7,471,484 B2 | 12/2008 | Wachenschwanz et al. | |
| 7,498,062 B2 | 3/2009 | Calcaterra et al. | |
| 7,531,485 B2 | 5/2009 | Hara et al. | |
| 7,537,846 B2 | 5/2009 | Ishiyama et al. | |
| 7,549,209 B2 | 6/2009 | Wachenschwanz et al. | |
| 7,569,490 B2 | 8/2009 | Staud | |
| 7,597,792 B2 | 10/2009 | Homola et al. | |
| 7,597,973 B2 | 10/2009 | Ishiyama | |
| 7,608,193 B2 | 10/2009 | Wachenschwanz et al. | |
| 7,632,087 B2 | 12/2009 | Homola | |
| 7,656,615 B2 | 2/2010 | Wachenschwanz et al. | |
| 7,682,546 B2 | 3/2010 | Harper | |
| 7,684,152 B2 | 3/2010 | Suzuki et al. | |
| 7,686,606 B2 | 3/2010 | Harper et al. | |
| 7,686,991 B2 | 3/2010 | Harper | |
| 7,695,833 B2 | 4/2010 | Ishiyama | |
| 7,722,968 B2 | 5/2010 | Ishiyama | |
| 7,733,605 B2 | 6/2010 | Suzuki et al. | |
| 7,736,768 B2 | 6/2010 | Ishiyama | |
| 7,755,861 B1 | 7/2010 | Li et al. | |
| 7,758,732 B1 | 7/2010 | Calcaterra et al. | |
| 7,833,639 B2 | 11/2010 | Sonobe et al. | |
| 7,833,641 B2 | 11/2010 | Tomiyasu et al. | |
| 7,910,159 B2 | 3/2011 | Jung | |
| 7,911,736 B2 | 3/2011 | Bajorek | |
| 7,924,519 B2 | 4/2011 | Lambert | |
| 7,944,165 B1 | 5/2011 | O'Dell | |
| 7,944,643 B1 | 5/2011 | Jiang et al. | |
| 7,955,723 B2 | 6/2011 | Umezawa et al. | |
| 7,983,003 B2 | 7/2011 | Sonobe et al. | |
| 7,993,497 B2 | 8/2011 | Moroishi et al. | |
| 7,993,765 B2 | 8/2011 | Kim et al. | |
| 7,998,912 B2 | 8/2011 | Chen et al. | |
| 8,002,901 B1 | 8/2011 | Chen et al. | |
| 8,003,237 B2 | 8/2011 | Sonobe et al. | |
| 8,012,920 B2 | 9/2011 | Shimokawa | |
| 8,038,863 B2 | 10/2011 | Homola | |
| 8,057,926 B2 | 11/2011 | Ayama et al. | |
| 8,062,778 B2 | 11/2011 | Suzuki et al. | |
| 8,064,156 B1 | 11/2011 | Suzuki et al. | |
| 8,076,013 B2 * | 12/2011 | Sonobe et al. | 428/827 |
| 8,092,931 B2 | 1/2012 | Ishiyama et al. | |
| 8,100,685 B1 | 1/2012 | Harper et al. | |
| 8,101,054 B2 | 1/2012 | Chen et al. | |
| 8,125,723 B1 | 2/2012 | Nichols et al. | |
| 8,125,724 B1 | 2/2012 | Nichols et al. | |
| 8,137,517 B1 | 3/2012 | Bourez | |
| 8,142,916 B2 | 3/2012 | Umezawa et al. | |
| 8,163,093 B1 | 4/2012 | Chen et al. | |

(56) References Cited

U.S. PATENT DOCUMENTS

| | | |
|---|---|---|
| 8,171,949 B1 | 5/2012 | Lund et al. |
| 8,173,282 B1 | 5/2012 | Sun et al. |
| 8,178,480 B2 | 5/2012 | Hamakubo et al. |
| 8,206,789 B2 | 6/2012 | Suzuki |
| 8,218,260 B2 | 7/2012 | Iamratanakul et al. |
| 8,247,095 B2 | 8/2012 | Champion et al. |
| 8,257,783 B2 | 9/2012 | Suzuki et al. |
| 8,298,609 B1 | 10/2012 | Liew et al. |
| 8,298,689 B2 | 10/2012 | Sonobe et al. |
| 8,309,239 B2 | 11/2012 | Umezawa et al. |
| 8,316,668 B1 | 11/2012 | Chan et al. |
| 8,331,056 B2 | 12/2012 | O'Dell |
| 8,354,618 B1 | 1/2013 | Chen et al. |
| 8,367,228 B2 | 2/2013 | Sonobe et al. |
| 8,383,209 B2 | 2/2013 | Ayama |
| 8,394,243 B1 | 3/2013 | Jung et al. |
| 8,397,751 B1 | 3/2013 | Chan et al. |
| 8,399,809 B1 | 3/2013 | Bourez |
| 8,402,638 B1 | 3/2013 | Treves et al. |
| 8,404,056 B1 | 3/2013 | Chen et al. |
| 8,404,369 B2 | 3/2013 | Ruffini et al. |
| 8,404,370 B2 | 3/2013 | Sato et al. |
| 8,406,918 B2 | 3/2013 | Tan et al. |
| 8,414,966 B2 * | 4/2013 | Yasumori et al. ............. 427/127 |
| 8,425,975 B2 | 4/2013 | Ishiyama |
| 8,431,257 B2 | 4/2013 | Kim et al. |
| 8,431,258 B2 | 4/2013 | Onoue et al. |
| 8,453,315 B2 | 6/2013 | Kajiwara et al. |
| 8,488,276 B1 | 7/2013 | Jung et al. |
| 8,491,800 B1 | 7/2013 | Dorsey |
| 8,492,009 B1 | 7/2013 | Homola et al. |
| 8,492,011 B2 | 7/2013 | Itoh et al. |
| 8,496,466 B1 | 7/2013 | Treves et al. |
| 8,517,364 B1 | 8/2013 | Crumley et al. |
| 8,517,657 B2 | 8/2013 | Chen et al. |
| 8,524,052 B1 | 9/2013 | Tan et al. |
| 8,530,065 B1 | 9/2013 | Chernyshov et al. |
| 8,546,000 B2 | 10/2013 | Umezawa |
| 8,551,253 B2 | 10/2013 | Na'im et al. |
| 8,551,627 B2 | 10/2013 | Shimada et al. |
| 8,556,566 B1 | 10/2013 | Suzuki et al. |
| 8,559,131 B2 | 10/2013 | Masuda et al. |
| 8,562,748 B1 | 10/2013 | Chen et al. |
| 8,565,050 B1 | 10/2013 | Bertero et al. |
| 8,570,844 B1 | 10/2013 | Yuan et al. |
| 8,580,410 B2 | 11/2013 | Onoue |
| 8,584,687 B1 | 11/2013 | Chen et al. |
| 8,591,709 B1 | 11/2013 | Lim et al. |
| 8,592,061 B2 | 11/2013 | Onoue et al. |
| 8,596,287 B1 | 12/2013 | Chen et al. |
| 8,597,723 B1 | 12/2013 | Jung et al. |
| 8,603,649 B2 | 12/2013 | Onoue |
| 8,603,650 B2 | 12/2013 | Sonobe et al. |
| 8,605,388 B2 | 12/2013 | Yasumori et al. |
| 8,605,555 B1 | 12/2013 | Chernyshov et al. |
| 8,608,147 B1 | 12/2013 | Yap et al. |
| 8,609,263 B1 | 12/2013 | Chernyshov et al. |
| 8,619,381 B2 | 12/2013 | Moser et al. |
| 8,623,528 B2 | 1/2014 | Umezawa et al. |
| 8,623,529 B2 | 1/2014 | Suzuki |
| 8,634,155 B2 | 1/2014 | Yasumori et al. |
| 8,658,003 B1 | 2/2014 | Bourez |
| 8,658,292 B1 | 2/2014 | Mallary et al. |
| 8,665,541 B2 | 3/2014 | Saito |
| 8,668,953 B1 | 3/2014 | Buechel-Rimmel |
| 8,674,327 B1 | 3/2014 | Poon et al. |
| 8,685,214 B1 | 4/2014 | Moh et al. |
| 8,696,404 B1 | 4/2014 | Sun et al. |
| 8,711,499 B1 | 4/2014 | Desai et al. |
| 8,743,666 B1 | 6/2014 | Bertero et al. |
| 8,758,912 B2 | 6/2014 | Srinivasan et al. |
| 8,787,124 B1 | 7/2014 | Chernyshov et al. |
| 8,787,130 B1 | 7/2014 | Yuan et al. |
| 8,791,391 B2 | 7/2014 | Bourez |
| 8,795,765 B2 | 8/2014 | Koike et al. |
| 8,795,790 B2 | 8/2014 | Sonobe et al. |
| 8,795,857 B2 | 8/2014 | Ayama et al. |
| 8,800,322 B1 | 8/2014 | Chan et al. |
| 8,811,129 B1 | 8/2014 | Yuan et al. |
| 8,817,410 B1 | 8/2014 | Moser et al. |
| 2002/0060883 A1 | 5/2002 | Suzuki |
| 2003/0022024 A1 | 1/2003 | Wachenschwanz |
| 2003/0082410 A1 | 5/2003 | Sato et al. |
| 2004/0022387 A1 | 2/2004 | Weikle |
| 2004/0132301 A1 | 7/2004 | Harper et al. |
| 2004/0202793 A1 | 10/2004 | Harper et al. |
| 2004/0202865 A1 | 10/2004 | Homola et al. |
| 2004/0209123 A1 | 10/2004 | Bajorek et al. |
| 2004/0209470 A1 | 10/2004 | Bajorek |
| 2004/0247941 A1 | 12/2004 | Chen et al. |
| 2005/0036223 A1 | 2/2005 | Wachenschwanz et al. |
| 2005/0122612 A1 * | 6/2005 | Albrecht et al. ............. 360/59 |
| 2005/0142990 A1 | 6/2005 | Homola |
| 2005/0150862 A1 | 7/2005 | Harper et al. |
| 2005/0151282 A1 | 7/2005 | Harper et al. |
| 2005/0151283 A1 | 7/2005 | Bajorek et al. |
| 2005/0151300 A1 | 7/2005 | Harper et al. |
| 2005/0155554 A1 | 7/2005 | Saito |
| 2005/0167867 A1 | 8/2005 | Bajorek et al. |
| 2005/0170212 A1 * | 8/2005 | Albrecht et al. ........... 428/694 T |
| 2005/0233174 A1 | 10/2005 | Munteanu et al. |
| 2005/0263401 A1 | 12/2005 | Olsen et al. |
| 2006/0134467 A1 * | 6/2006 | Hirayama et al. ......... 428/828.1 |
| 2006/0147758 A1 | 7/2006 | Jung et al. |
| 2006/0181697 A1 | 8/2006 | Treves et al. |
| 2006/0207890 A1 | 9/2006 | Staud |
| 2007/0070549 A1 | 3/2007 | Suzuki et al. |
| 2007/0072011 A1 | 3/2007 | Li et al. |
| 2007/0148499 A1 * | 6/2007 | Sonobe et al. ............... 428/828 |
| 2007/0245909 A1 | 10/2007 | Homola |
| 2008/0075845 A1 | 3/2008 | Sonobe et al. |
| 2008/0093760 A1 | 4/2008 | Harper et al. |
| 2009/0117408 A1 | 5/2009 | Umezawa et al. |
| 2009/0136784 A1 | 5/2009 | Suzuki et al. |
| 2009/0169922 A1 | 7/2009 | Ishiyama |
| 2009/0191331 A1 | 7/2009 | Umezawa et al. |
| 2009/0202866 A1 | 8/2009 | Kim et al. |
| 2009/0311557 A1 | 12/2009 | Onoue et al. |
| 2010/0021768 A1 | 1/2010 | Sonobe et al. |
| 2010/0143752 A1 | 6/2010 | Ishibashi et al. |
| 2010/0190035 A1 | 7/2010 | Sonobe et al. |
| 2010/0196619 A1 | 8/2010 | Ishiyama |
| 2010/0196740 A1 | 8/2010 | Ayama et al. |
| 2010/0209601 A1 | 8/2010 | Shimokawa et al. |
| 2010/0215992 A1 | 8/2010 | Horikawa et al. |
| 2010/0232065 A1 | 9/2010 | Suzuki et al. |
| 2010/0247965 A1 | 9/2010 | Onoue |
| 2010/0261039 A1 | 10/2010 | Itoh et al. |
| 2010/0279151 A1 | 11/2010 | Sakamoto et al. |
| 2010/0300884 A1 | 12/2010 | Homola et al. |
| 2010/0304186 A1 | 12/2010 | Shimokawa |
| 2011/0097603 A1 | 4/2011 | Onoue |
| 2011/0097604 A1 | 4/2011 | Onoue |
| 2011/0171495 A1 | 7/2011 | Tachibana et al. |
| 2011/0181984 A1 * | 7/2011 | Okawa et al. ................ 360/110 |
| 2011/0206947 A1 | 8/2011 | Tachibana et al. |
| 2011/0212346 A1 | 9/2011 | Onoue et al. |
| 2011/0223446 A1 | 9/2011 | Onoue et al. |
| 2011/0244119 A1 | 10/2011 | Umezawa et al. |
| 2011/0299194 A1 | 12/2011 | Aniya et al. |
| 2011/0311841 A1 | 12/2011 | Saito et al. |
| 2012/0069466 A1 | 3/2012 | Okamoto et al. |
| 2012/0070692 A1 | 3/2012 | Sato et al. |
| 2012/0077060 A1 | 3/2012 | Ozawa |
| 2012/0127599 A1 | 5/2012 | Shimokawa et al. |
| 2012/0127601 A1 | 5/2012 | Suzuki et al. |
| 2012/0129009 A1 | 5/2012 | Sato et al. |
| 2012/0140359 A1 | 6/2012 | Tachibana |
| 2012/0141833 A1 | 6/2012 | Umezawa et al. |
| 2012/0141835 A1 | 6/2012 | Sakamoto |
| 2012/0148875 A1 | 6/2012 | Hamakubo et al. |
| 2012/0156523 A1 | 6/2012 | Seki et al. |
| 2012/0164488 A1 | 6/2012 | Shin et al. |
| 2012/0170152 A1 | 7/2012 | Sonobe et al. |

(56) References Cited

U.S. PATENT DOCUMENTS

| | | |
|---|---|---|
| 2012/0171369 A1 | 7/2012 | Koike et al. |
| 2012/0175243 A1 | 7/2012 | Fukuura et al. |
| 2012/0189872 A1 | 7/2012 | Umezawa et al. |
| 2012/0196049 A1 | 8/2012 | Azuma et al. |
| 2012/0207919 A1 | 8/2012 | Sakamoto et al. |
| 2012/0225217 A1 | 9/2012 | Itoh et al. |
| 2012/0251842 A1 | 10/2012 | Yuan et al. |
| 2012/0251846 A1 | 10/2012 | Desai et al. |
| 2012/0276417 A1 | 11/2012 | Shimokawa et al. |
| 2012/0308722 A1 | 12/2012 | Suzuki et al. |
| 2013/0040167 A1 | 2/2013 | Alagarsamy et al. |
| 2013/0071694 A1 | 3/2013 | Srinivasan et al. |
| 2013/0165029 A1 | 6/2013 | Sun et al. |
| 2013/0175252 A1 | 7/2013 | Bourez |
| 2013/0216865 A1 | 8/2013 | Yasumori et al. |
| 2013/0230647 A1 | 9/2013 | Onoue et al. |
| 2013/0314815 A1 | 11/2013 | Yuan et al. |
| 2014/0011054 A1 | 1/2014 | Suzuki et al. |
| 2014/0044992 A1 | 2/2014 | Onoue |
| 2014/0050843 A1 | 2/2014 | Yi et al. |
| 2014/0103358 A1* | 4/2014 | Maeda et al. .................. 257/76 |
| 2014/0151360 A1 | 6/2014 | Gregory et al. |
| 2014/0234666 A1 | 8/2014 | Knigge et al. |

FOREIGN PATENT DOCUMENTS

| | | |
|---|---|---|
| JP | 2-263323 | 10/1990 |
| JP | 4-133306 A | 5/1992 |
| JP | 7-141641 A | 6/1995 |
| JP | 08069641 A * | 3/1996 |
| WO | 2008/099859 A1 | 8/2008 |
| WO | 2008146351 A1 | 12/2008 |

OTHER PUBLICATIONS

Sonobe et al "Thermal Stability and SNR of Coupled Granular/Continuous Media" Trans. on Magn. vol. 37, No. 4, Jul. 2001 p. 1667-1670.

Japanese Office Action dated Oct. 4, 2011 for related Japanese Appln. No. 2008-067028, 2 pages.

Singapore Office Action dated Sep. 28, 2012 for related Singapore Appln. No. 201003749-7, 19 pages.

* cited by examiner

MAGNETIC RECORDING MEDIUM INCLUDING TAILORED EXCHANGE COUPLING LAYER AND MANUFACTURING METHOD OF THE SAME

This is a Divisional of application Ser. No. 12/745,194 filed May 27, 2010, claiming priority based on International Application No. PCT/JP2009/054395, filed on Mar. 9, 2009, which claims priority from Japanese Patent Application No. 2008-067028 filed Mar. 17, 2008, the contents of all of which are incorporated herein by reference in their entirety.

TECHNICAL FIELD

The present invention relates to magnetic recording media and manufacturing method of the media and more particularly, to magnetic recording media in perpendicular magnetic recording type and manufacturing method of the media.

BACKGROUND ART

In recent years, in magnetic recording apparatuses typified by a HDD (Hard Disk Drive), since the high recording resolution is obtained, perpendicular magnetic recording type have been put into practical use which are comprised of perpendicular two-layer media and single-pole head. Further, as measures for enhancing the in-plane recording density, techniques have been developed to make the magnetic layer bearing recording finer. In the techniques, heat stability of magnetic particles deteriorates due to finer particles, and faced is the so-called thermal fluctuation problem such as deterioration and loss of recorded information. To solve the problem, it has been carried out to provide the magnetic fine-particle structure with increased heat stability using an exchange-coupling type medium that magnetically couples magnetic particles to magnetically stabilize. For example, in CGC media, granular having a fine-particle structure is provided with an exchange coupling layer, and mutually separated magnetic particles are exchange-coupled via the exchange coupling layer (Patent Document 1).
Patent Document 1: U.S. Pat. No. 6,468,670

DISCLOSURE OF INVENTION

However, in order to strengthen the exchange coupling in the above-mentioned structure, it is required to increase the thickness of the exchange coupling layer to some extent. When the thickness of the exchange coupling layer is thickened, the distance from the main recording layer bearing recording to a magnetic head is inevitably increased, and there is a problem that the so-called spacing loss is increased.

The present invention was made in view of the aforementioned respect, and it is an object of the invention to provide a magnetic recording medium enabling excellent magnetic recording reproduction characteristics to be exhibited with the spacing loss reduced, and a manufacturing method of the medium.

A method of manufacturing a magnetic recording medium of the invention is a method of manufacturing a magnetic recording medium for manufacturing a magnetic recording medium having a magnetic recording layer of a granular structure having nonmagnetic boundary portions between pillar-shaped magnetic particles on a nonmagnetic substrate, and an exchange coupling layer provided on the magnetic recording layer to add an action of exchange coupling the magnetic particles, and is characterized by having an ion irradiation step of performing ion irradiation on the entire surface of the exchange coupling layer after layering the exchange coupling layer on the magnetic recording layer.

A method of manufacturing a magnetic recording medium of the invention is a method of manufacturing a magnetic recording medium for manufacturing a magnetic recording medium having a magnetic recording layer of a granular structure having nonmagnetic boundary portions between pillar-shaped magnetic particles on a nonmagnetic substrate, and an exchange coupling layer provided on the magnetic recording layer to add an action of exchange coupling the magnetic particles, and is characterized by having an ion irradiation step of performing ion irradiation on the entire surface of the exchange coupling layer so that an amount of change in the ratio c/a of the c axis to the a axis in a crystal lattice of a metal having a hexagonal close-packed structure contained in the exchange coupling layer is 10.21% or more.

According to these method, by ion irradiation, it is possible to effectively control minute exchange coupling occurring between the magnetic recording layer having a fine structure hard to prepare and the exchange coupling layer, it is thus possible to perform with ease without changing various characteristics as a magnetic recording medium, and the magnetic recording media can thereby be manufactured without reducing productivity.

In the method of manufacturing a magnetic recording medium of the invention, it is preferable that the exchange coupling layer is a film containing Pt and Co, and that the metal is Co.

In the method of manufacturing a magnetic recording medium of the invention, it is preferable that the thickness of the exchange coupling layer is 7 nm or less, and that a dose in the ion irradiation is in the range of $1 \times 10^{13}$ to $1 \times 10^{15}$ (ions/cm$^2$).

In the method of manufacturing a magnetic recording medium of the invention, it is preferable that in the ion irradiation step, ions are applied from above a protective layer after layering the exchange coupling layer on the magnetic recording layer and further forming the protective layer on the exchange coupling layer.

A magnetic recording medium of the invention is a magnetic recording medium having a magnetic recording layer of a granular structure, where pillar-shaped magnetic particles spatially have nonmagnetic boundary portions therebetween, on a nonmagnetic substrate, and an exchange coupling layer provided on the magnetic recording layer to add an action of exchange coupling the magnetic particles, and is characterized in that reversed magnetic domain nucleation magnetic field Hn is −2000Oe (×10$^3$/4π A/m) or more, a ratio Hn/Hc of reversed magnetic domain nucleation magnetic field Hn to coercive force Hc is −0.5 or less, and the thickness of the exchange coupling layer is 7 nm or less.

According to this configuration, by performing ion irradiation on the exchange coupling layer, although the film thickness is thin, it is possible to exhibit high exchange coupling force. Therefore, without increasing the spacing loss, it is possible to obtain excellent magnetic recording reproduction characteristics with the exchange coupling force exerted.

In the magnetic recording medium of the invention, the exchange coupling layer preferably contains Pt, Co and Cr.

The magnetic recording medium of the invention is a magnetic recording medium having a magnetic recording layer of a granular structure, where pillar-shaped magnetic particles spatially have nonmagnetic boundary portions therebetween, on a nonmagnetic substrate, and an exchange coupling layer provided on the magnetic recording layer to add an action of exchange coupling the magnetic particles, has reversed magnetic domain nucleation magnetic field Hn of −2000Oe ($\times 10^3/4\pi$ A/m) or more, a ratio Hn/Hc of reversed magnetic domain nucleation magnetic field Hn to coercive force Hc of −0.5 or less, and a film thickness of the exchange coupling layer of 7 nm or less, and is capable of reducing the spacing loss and exhibiting excellent magnetic recording reproduction characteristics.

BEST MODE FOR CARRYING OUT THE INVENTION

An Embodiment of the invention will specifically be described below with reference to accompanying drawings.

Figure 1:
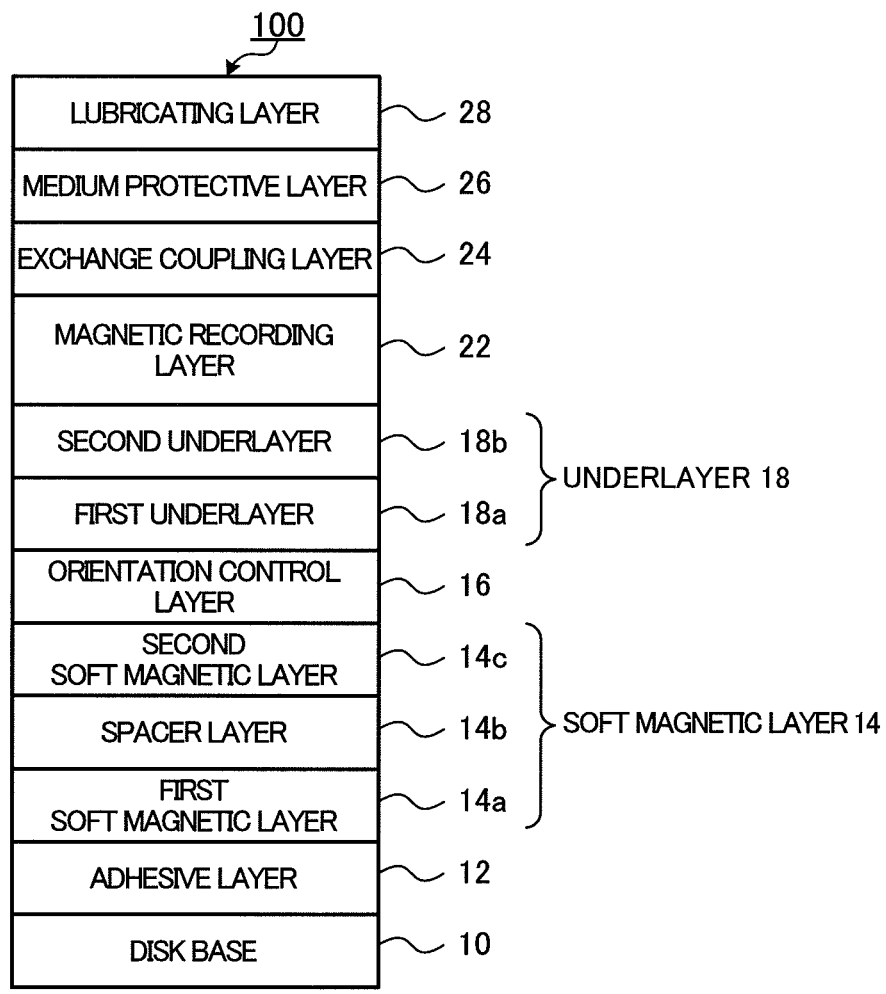
FIG. 1 is a diagram illustrating a configuration of a magnetic recording medium according to an Embodiment of the invention.

FIG. 1 is a cross-sectional view showing a schematic configuration of a magnetic recording medium according to an Embodiment of the invention. This magnetic recording medium is a magnetic recording medium used in perpendicular magnetic recording reproduction type.

The magnetic recording medium 100 as shown in FIG. 1 is comprised of a disk base 10, adhesive layer 12, first soft magnetic layer 14a, spacer layer 14b, second soft magnetic layer 14c, orientation control layer 16, first underlayer 18a, second underlayer 18b, magnetic recording layer 22, auxiliary recording layer 24, medium protective layer 26 and lubricating layer 28, where each layer is stacked in this order. In addition, the first soft magnetic layer 14a, spacer layer 14b and second soft magnetic layer 14c constitute a soft magnetic layer 14. The first underlayer 18a and second underlayer 18b constitute an underlayer 18.

As the disk base 10, for example, it is possible to use glass substrates, aluminum substrates, silicon substrates, plastic substrates, etc. When glass substrates are used as the disk base 10, for example, amorphous aluminosilicate glass is formed into a disk shape by direct press to prepare glass disks, and the glass disks are subjected to lapping, polishing and chemical strength successively to prepare the base.

The adhesive layer 12 is a layer to enhance adhesion with the disk base 10, and is capable of preventing the soft magnetic layer 14 from peeling off. As the adhesive layer 12, for example, it is possible to use CrTi films, etc.

As the first soft magnetic layer 14a and second soft magnetic layer 14c of the soft magnetic layer 14, for example, it is possible to use FeCoTaZr films, etc. Examples of the spacer layer 14b include Ru films. The first soft magnetic layer 14a and second soft magnetic layer 14c undergo antiferro-magnetic exchange coupling (AFC), the magnetization direction of the soft magnetic layer 14 can thereby be aligned along the magnetic path (magnetic circuit) with high accuracy, components perpendicular to the magnetization direction are extremely reduced, and it is possible to decrease noise occurring from the soft magnetic layer 14.

The orientation control layer 16 protects the soft magnetic layer 14, while promoting orientation of crystal particles of the underlayer 18. As materials for the orientation control layer 16, it is possible to use a material selecting from Ni, Cu, Pt, Pd, Zr, Hf and Nb. Further, with the metals as a main component, it is possible to use alloys containing one or more additive elements of Ti, V, Ta, Cr, Mo and W. For example, NiW, CuW and CuCr are suitable.

Materials constituting the underlayer 18 have an hcp structure, and are capable of growing crystals of the hcp structure of materials constituting the magnetic recording layer 22 as a granular structure. Accordingly, as the crystal orientation of the underlayer 18 is higher, it is possible to enhance the orientation of the magnetic recording layer 22. Among the materials for the underlayer 18 are RuCr and RuCo, as well as Ru. Ru has an hcp structure, and enables the magnetic recording layer with Co as a main component to be oriented with excellence.

In this Embodiment, the underlayer 18 is comprised of a Ru film of a two-layer structure. In forming the second underlayer 18b on the upper side, the gas pressure of Ar is made higher than in forming the first underlayer 18a on the lower side. When the gas pressure is increased, since the free migration length of sputtered plasma ion is reduced, the deposition rate is decreased, and the crystal orientation is improved. Further, by increasing the pressure, the size of the crystal lattice is decreased. Since the size of the crystal lattice of Ru is larger than the crystal lattice of Co, decreasing the crystal lattice of Ru approaches the crystal lattice of Co, and it is possible to further enhance the crystal orientation of the granular layer of Co.

The magnetic recording layer 22 is a magnetic layer of a one-layer granular structure. Examples of materials for the magnetic recording layer 22 are CoCrPt—$Cr_2O_3$, CoCrPt—$SiO_2$, and CoCrPt—$TiO_2$. These materials may contain a plurality of oxides.

The exchange coupling layer 24 is a thin film (auxiliary recording layer) showing high perpendicular magnetic anisotropy and high saturation magnetization Ms (saturation magnetization Ms higher than that in the granular magnetic layer 22) on the granular magnetic layer 22, and exchange-couples magnetic particles in the magnetic recording layer. The exchange coupling layer 24 is intended to improve reversed magnetic domain nucleation magnetic field Hn, resistance to thermal fluctuations, and overwrite characteristics. As the exchange coupling layer 24, for example, it is possible to use CoCrPt and CoCrPtB films. In the magnetic recording medium with such a configuration, exchange coupling is provided in between the magnetic recording layer and the exchange coupling layer.

The layers of from the adhesive layer 12 to exchange coupling layer 24 are deposited successively on the disk base 10 by a DC magnetron sputtering method in an atmosphere of Ar using a vacuumed deposition apparatus. With consideration given to productivity, it is preferable to form the layers and films by inline type deposition.

The medium protective layer 26 is a protective layer to protect the magnetic recording layer from shock of a magnetic head. Examples of materials constituting the medium protective layer 26 are Cr, Cr alloys, carbon, zirconium, and silica. Generally, carbon deposited by a CVD method improves the film hardness as compared with the film deposited by a sputtering method, and is capable of protecting the perpendicular recording layer more effectively against shock from the magnetic head.

As the lubricating layer 28, for example, perfluoro polyether (PEPE) that is a liquid lubricant is diluted with a solvent such as Freon, is applied onto the medium surface by a dipping method, spin coating method or spray method, and undergoes heating processing when necessary, and the layer 28 is formed.

Described next is the exchange coupling layer of the magnetic recording medium according to the invention.

In the magnetic recording medium according to the invention, it is preferable that the exchange coupling layer 24 contains a metal having a hexagonal close-packed structure, and that an amount of change in the ratio c/a of the c axis to the a axis in a crystal lattice of the metal ranges from 10.21% to 10.81%.

In the hexagonal close-packed structure, a state, where an amount of change in the ratio c/a of the c axis to the a axis ranges from 10.21% (+0.2% or more or −0.2% or less) to 10.81% (+0.8% or more or −0.8% or less), is a state where the hexagonal close-packed structure becomes distorted. In other words, this state distorts the hexagonal close-packed structure, increases (extends) the a-axis lattice spacing, and decreases (shrinks) the c-axis lattice spacing. To thus distort the hexagonal close-packed structure, ion irradiation is performed on the entire surface of the exchange coupling layer 24. By the applied ions, it is possible to narrow the c-axis lattice spacing, and widen the a-axis lattice spacing in the hexagonal close-packed structure. In addition, an amount of change in each of the c axis and/or the axis is 10.11% or more (+0.1% or more or −0.1% or less), and preferably, 10.21% or more (+0.2% or more or −0.2% or less).

Figure 2:
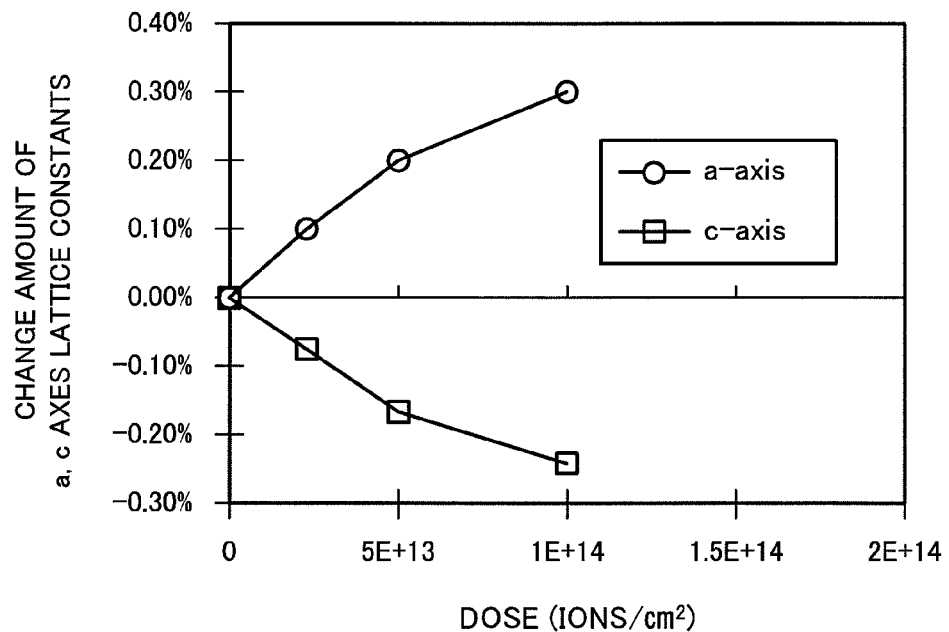
FIG. 2 is a graph illustrating the relationship between an amount of change in lattice constant and a dose of ion irradiation.
Figure 3:
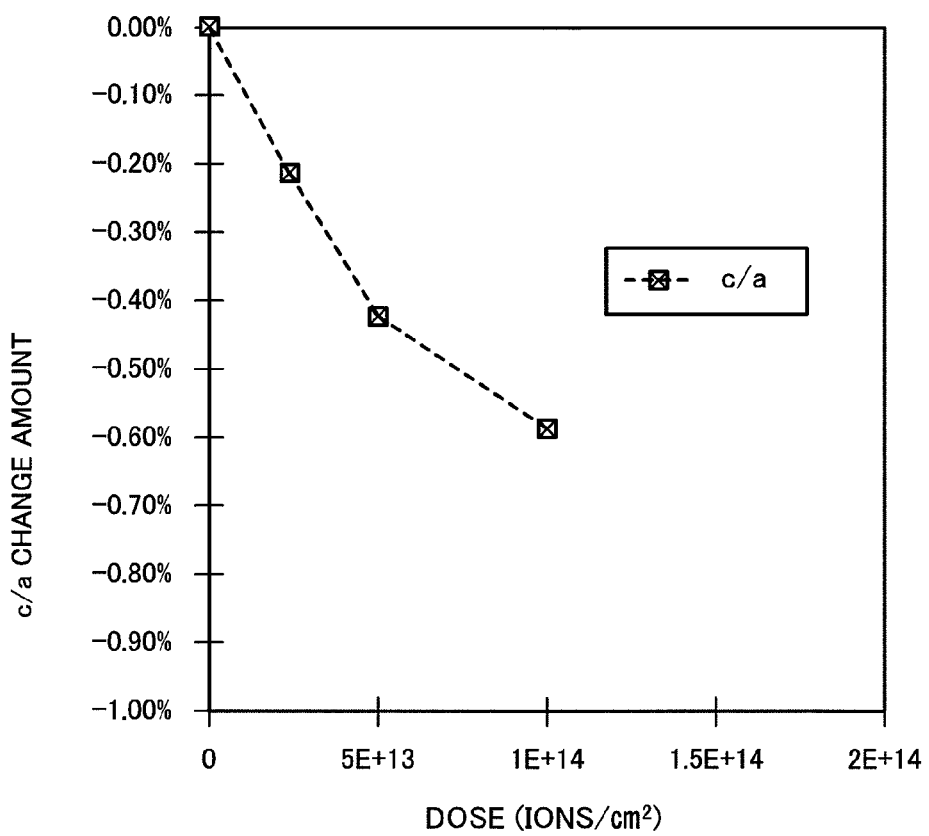
FIG. 3 is a graph illustrating the relationship between an amount of C/A change and the dose of ion irradiation.

The inventors of the invention measured X-ray diffraction of the exchange coupling layer irradiated with Ar+ ions and examined on whether the hexagonal close-packed structure becomes distorted by ion irradiation. Herein, a CoCrPtB film containing Pt and Co was used as the exchange coupling layer, and the crystal lattice of Co was examined. The results are shown in FIGS. 2 and 3. As can be seen from FIG. 2, as the dose in ion irradiation increases, the a-axis lattice spacing is increased, and the c-axis lattice spacing is decreased. Further, as can be seen from FIG. 3, as the dose in ion irradiation increases, an amount of change in c/a is increased. In this way, it was confirmed that the hexagonal close-packed structure becomes distorted by ion irradiation.

The conditions of ion irradiation to thus distort the hexagonal close-packed structure can be determined as appropriate in consideration of the film thickness of the exchange coupling layer 24. For example, when the thickness of the exchange coupling layer 24 ranges from 3 nm to 7 nm, the dose in ion irradiation preferably ranges from $1\times10^{13}$ to $5\times10^{14}$ (ions/cm$^2$).

The film thickness is thinned in the exchange coupling layer with the hexagonal close-packed structure thus distorted. Described next is the exchange coupling force of the exchange coupling layer with the film thickness thus thinned. When the film thickness is changed in the exchange coupling layer 24, the coercive force (Hc) and reversed magnetic domain nucleation magnetic field (Hn) change. As the exchange coupling layer 24 is thicker, Hc decreases and the absolute value of Hn increases (the value is negative, and therefore, decreases). Herein, as an indicator indicating the exchange coupling force, Hn/Hc is used. Actually, the value of the gradient a of magnetization curve is preferably, but Hn can be seen easier than the value of the gradient a, and the value of Hn is used to examine.

Figure 4:
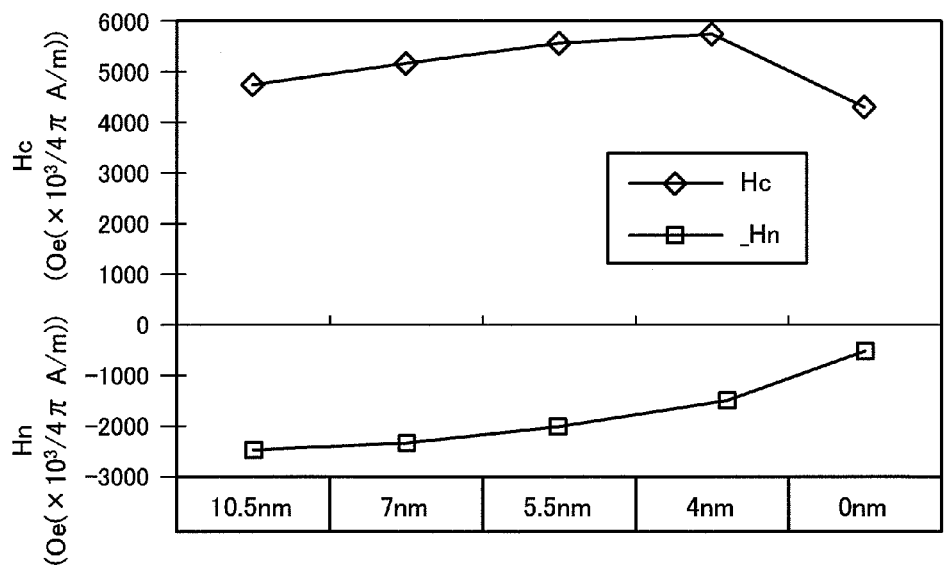
FIG. 4 is a diagram illustrating the relationships between an exchange coupling layer thickness, and Hc and Hn.

In magnetic recording media where on the glass substrate were successively layered a soft magnetic layer (CoTaZrFe/Ru/CoTaZrFe) with a thickness of 60 nm, orientation control layer (NiW) with a thickens of 10 nm, underlayer (Ru) with a thickness of 20 nm, magnetic recording layer (CoCrPt-oxide) with a thickness of 13 nm, exchange coupling layer, medium protective layer with a thickness of 5 nm, and lubricating layer with a thickness of 1.3 nm, Hc and Hn were obtained when the film thickness of the exchange coupling layer 24 was 10.5 nm, 7 nm, 5.5 nm, 4 nm and 0 nm. In addition, Hc and Hn were measured using NEOARK corporation Kerr magnetism measurement equipment, while applying the external magnetization with the Kerr diffraction angle of the magnetic recording layer set at the perpendicular direction. The results are shown in FIG. 4. As can be seen from FIG. 4, as the exchange coupling increases (the thickness of the exchange coupling layer decreases), the rectangular shape of hysteresis of the magnetization curve is better, and the absolute value of Hn increases.

Figure 5:
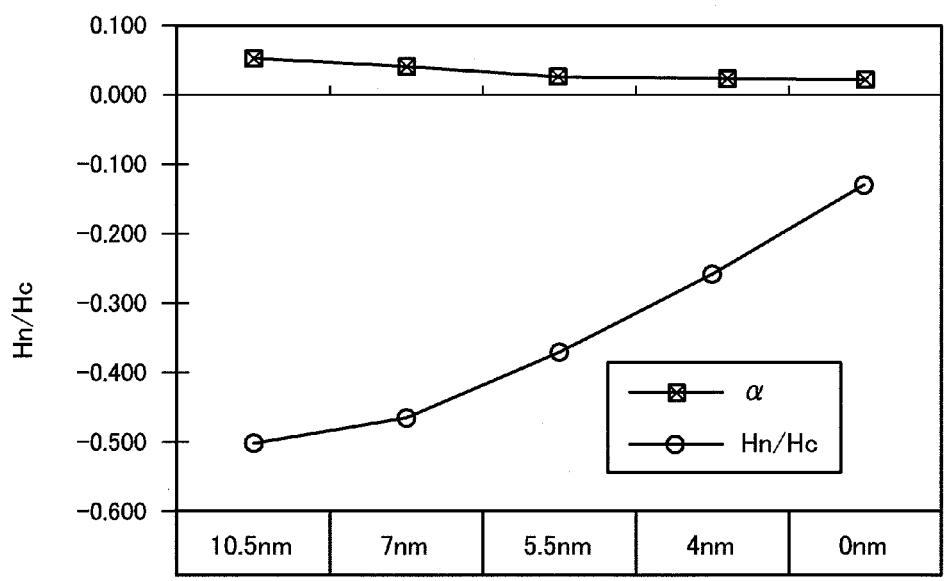
FIG. 5 is a graph illustrating the relationships between the exchange coupling layer thickness, and Hn/Hc and the gradient a of the magnetization curve.

Further, the gradient a of the magnetization curve and the value of Hn/Hc were obtained when the film thickness of the exchange coupling layer 24 was thus 10.5 nm, 7 nm, 5.5 nm, 4 nm and 0 nm. The results are shown in FIG. 5. As can be seen from FIG. 5, in the gradient a of the magnetization curve, equal values are obtained in no exchange coupling layer 24 and the exchange coupling layer with a thickness of 5.5 nm. Meanwhile, the value of Hn/Hc is higher as the film thickness of the exchange coupling layer 24 is thinner. Thus, with respect to the exchange coupling force in the exchange coupling layer when the film thickness is changed, it is understood that using Hn/Hc as an indicator is preferable to using a as an indicator.

Figure 6:
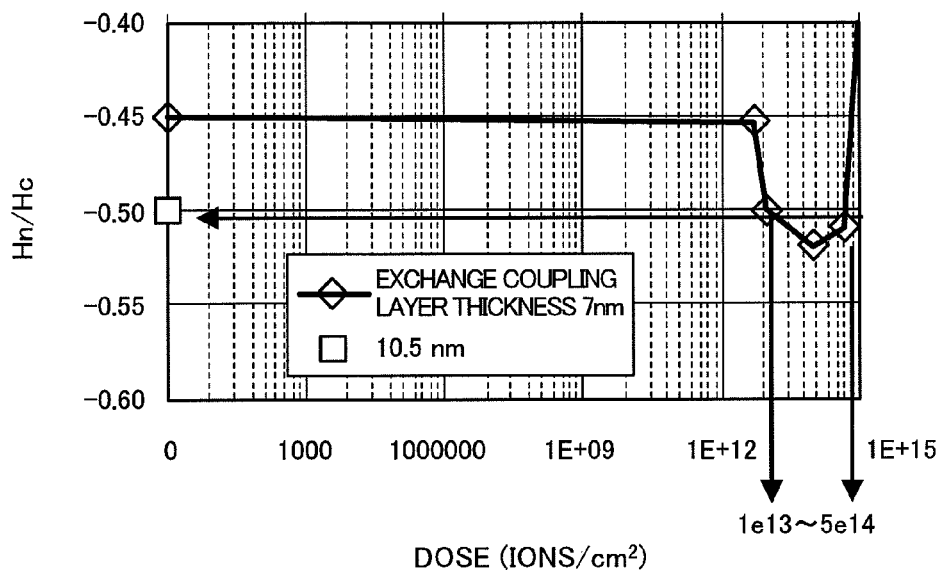
FIG. 6 is a graph illustrating the relationship between Hn/Hc and the dose of ion irradiation.

Then, in the magnetic recording media with the above-mentioned configuration, the inventors of the invention examined Hn/Hc when ion irradiation was performed on the exchange coupling layer while changing the film thickness of the exchange coupling layer 24 to 10.5 nm, 7 nm and 5.5 nm. The results are shown in FIG. 6. As can be seen from FIG. 6, with respect to Hn/Hc to be an indicator of the exchange coupling force, almost the same values are shown in the exchange coupling layer with a thickness of 10.5 nm without undergoing ion irradiation and the exchange coupling layer with a thickness of 7 nm with ion irradiation (dose: $4\times10^{13}$ (ions/cm$^2$) performed thereon. In other words, by performing ion irradiation on the exchange coupling layer, although the film thickness was thin, it was possible to cause the high exchange coupling force to be exerted.

In the invention, Hn/Hc is a negative value, preferably −0.2 or less, and more preferably, −0.5 or less. Further, in this range, it is preferable that a value is lower in the case of performing ion irradiation than in the case of not performing ion irradiation, and it is more preferable that a value is lower in the case of performing ion irradiation than in the case of not performing ion irradiation by −0.05 or less. Accordingly, it is desirable to define the thickness of the exchange coupling layer so as to obtain such Hn/Hc, and further, it is desirable to set conditions of ion irradiation so as to obtain such a thickness of the exchange coupling layer. Furthermore, the reversed magnetic domain nucleation magnetic field Hn is preferably −2000Oe ($\times10^3/4\pi$ A/m) or more.

The magnetic recording media with the above-mentioned configuration exhibit the high exchange coupling force by performing ion irradiation on the exchange coupling layer, although the film thickness is thin. Therefore, without increasing the spacing loss, it is possible to obtain excellent magnetic recording reproduction characteristics with the exchange coupling force exerted. Further, in the method of the invention, by ion irradiation, it is possible to effectively control minute exchange coupling occurring between the magnetic recording layer having a fine structure hard to prepare and the exchange coupling layer, it is thus possible to perform with ease without changing various characteristics as a magnetic recording medium, and the magnetic recording media can thereby be manufactured without reducing productivity.

Further, the magnetic recording medium according to the invention is a magnetic recording medium provided with a magnetic recording layer having a granular structure with nonmagnetic layers between magnetic particles, and an exchange coupling layer that is provided on the magnetic recording layer to subject the magnetic particles to exchange coupling, and may have a configuration that the exchange coupling layer contains a metal having a hexagonal close-packed structure, and an amount of change in the ratio c/a of the c axis to the a axis in a crystal lattice of the metal ranges from 10.21% to 10.81%.

Furthermore, in the magnetic recording medium according to the invention, such a structure is more preferable that the exchange coupling layer is a film containing Pt and Co, and that the metal is Co.

Still furthermore, in the magnetic recording medium according to the invention, such a structure is more preferable that the thickness of the exchange coupling layer ranges from 3 nm to 7 nm.

Moreover, in the magnetic recording medium according to the invention, such a structure is more preferable that the ratio Hn/Hc of reversed magnetic domain nucleation magnetic field Hn to coercive force Hc is −0.2 or less in the exchange coupling layer.

Further, a method of manufacturing a magnetic recording medium of the invention is a method of manufacturing a magnetic recording medium provided with a magnetic recording layer having a granular structure with nonmagnetic portions between magnetic particles, and an exchange coupling layer provided on the magnetic recording layer to add an action of exchange coupling the magnetic particles, where the method may have a configuration that ion irradiation is performed on the exchange coupling layer, and that an amount of change in the ratio c/a of the c axis to the a axis in a crystal lattice of a metal having a hexagonal close-packed structure contained in the exchange coupling layer is 10.21% or more.

Described next is an Example performed to clarify the effects of the invention.

EXAMPLE

Amorphous aluminosilicate glass was formed into a disk shape by direct press to prepare glass disks, and the glass disks were subjected to lapping, polishing and chemical strength successively to prepare the glass substrates. On the glass substrate were deposited successively a soft magnetic layer (CoTaZrFe/Ru/CoTaZrFe) with a thickness of 60 nm, a NiW film with a thickness of 10 nm, a Ru film with a thickness of 20 nm, a CorCrPt—SiO$_2$ film with a thickness of 13 nm, and an exchange coupling layer (CoCrPt) with a thickness of 7 nm by a DC magnetron sputtering method in an atmosphere of Ar. Next, the exchange coupling layer was irradiated with Ar$^+$ ions with a dose of 4×10$^{13}$ (ions/cm$^2$). Then, a carbon layer with a thickness of 5 nm was formed on the exchange coupling layer by a CVD method, a lubricating layer with a thickness of 1.3 nm was formed on the carbon layer by a dip method, and magnetic recording media of this Example were prepared.

Figure 7:
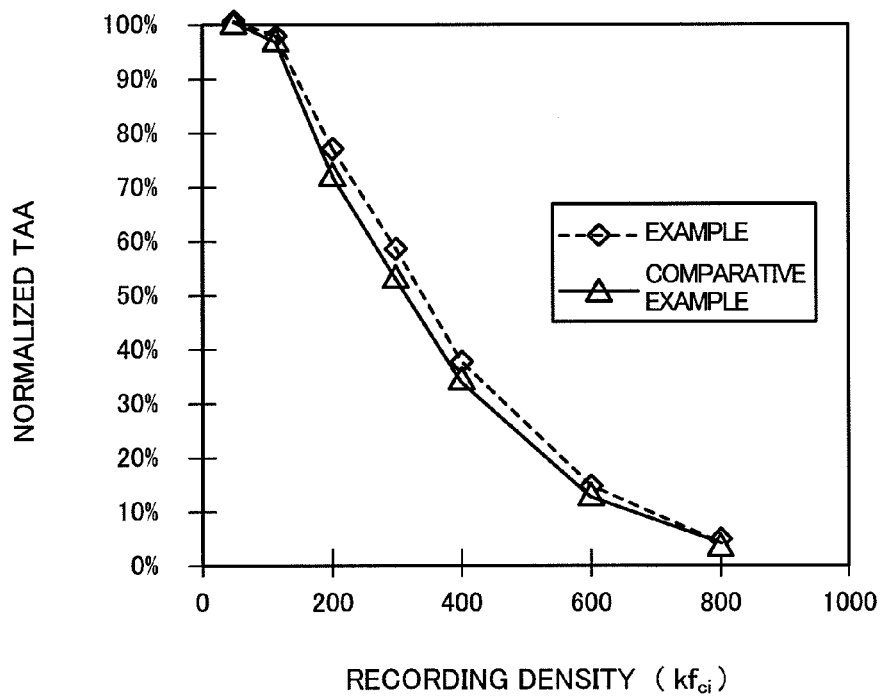
FIG. 7 is a graph illustrating the recording density dependence of standardized output obtained from output voltage.

Electromagnetic conversion characteristic evaluations were performed on the obtained magnetic recording media. The electromagnetic conversion characteristic evaluations were performed by examining recording reproduction characteristics by a magnetic head using a spin stand. More specifically, signals were recorded while changing the recording frequency and further changing the recording density, reproduction outputs of the signals were read, and the characteristics were thus examined. In addition, as a magnetic head, a perpendicular recording merge type head was used where a perpendicular recording single-pole head (for recording) and GMR head (for reproduction) are merged. The results are shown in FIG. 7. FIG. 7 is a graph illustrating the recording density dependence of standardized output (normalized TAA) obtained from the output voltage.

COMPARATIVE EXAMPLE

Magnetic recording media of a Comparative Example were prepared in the same way as in the Example except ion irradiation being not performed on the exchange coupling layer with a film thickness of the exchange coupling layer of 10.5 nm. Electromagnetic conversion characteristic evaluations were performed on the obtained magnetic recording media in the same way as in the Example. The results are also shown in FIG. 7.

As can be seen from FIG. 7, in the magnetic recording media of the Example, the so-called T$_{50}$ is improved that is the recording density when an output voltage obtained from roll-off becomes 50%. In other words, in the magnetic recording media of this Example, the resolution of a medium output is improved. This is because it is considered that in the magnetic recording media of the Example, a desired exchange coupling force is obtained by ion irradiation even when the film thickness is thin, and that the spacing loss is reduced.

The present invention is not limited to the above-mentioned Embodiment, and is capable of being carried into practice with modifications thereof as appropriate. For example, the magnetic recording layer and the exchange control layer are not limited particularly in their structures, but preferably, the magnetic recording layer is at least one magnetic layer having a granular structure, and as the exchange coupling layer, it is possible to use a layer having a granular structure, continuous film, the so-called cap layer where the degree of isolation of particles is lower than that in the granular layer, or an amorphous layer without having a crystal structure. Further, it is considered that the strongest exchange coupling is exerted when the magnetic recording layer and the exchange coupling are in direct contact with each other, but direct contact is not always necessary. Furthermore, as the relative positions of the magnetic recording layer and the exchange coupling layer, it is considered better that the magnetic recording layer is arranged in the vicinity of a recording reproduction head, but in perpendicular recording media and the like where a soft magnetic reinforcing layer exists to supplement the head write magnetic field, when the sufficient magnetic field is applied to the recording layer, the exchange coupling layer may be disposed closer to the head, and the magnetic layer may be disposed relatively far from the head.

Moreover, the layer structures, the materials for members, the numbers, sizes, processing procedures and the like in the above-mentioned Embodiment are of examples, and are capable of being carried into practice with various modifications thereof within the scope of exhibiting the effects of the invention. Further, the invention is capable of being carried into practice with modifications thereof as appropriate without departing from the scope of the invention.

The invention claimed is:

1. A magnetic recording medium comprising:
a non-magnetic substrate;
a magnetic recording layer of a granular structure, where pillar-shaped magnetic particles spatially have nonmagnetic boundary portions therebetween, on the nonmagnetic substrate; and
an exchange coupling layer provided on the magnetic recording layer to add an action of exchange coupling the magnetic particles,
wherein reversed magnetic domain nucleation magnetic field Hn is −2000 Oe or more, a ratio Hn/Hc of reversed magnetic domain nucleation magnetic field Hn to coercive force Hc is −0.5 or less, and a film thickness of the exchange coupling layer is 7 nm or less,
wherein said exchange coupling layer has been subject to ion irradiation and an amount of change in a ratio c/a of a c-axis to an a-axis in a crystal lattice of a metal having a hexagonal close-packed structure contained in the exchange coupling layer is 10.21% or more after performing said ion irradiation.

2. The magnetic recording medium according to claim 1, wherein the exchange coupling layer contains Pt, Co and Cr.

3. The magnetic recording medium according to claim 1, wherein a thickness of the exchange coupling layer is 3 nm or more.

4. The magnetic recording medium according to claim 1, wherein said exchange coupling layer being a film containing the metal having the hexagonal closed packed structure and providing an exchange coupling layer surface.

5. The magnetic recording medium according to claim 1, wherein the exchange coupling layer is a film containing Pt and Co, and the metal having the hexagonal closed packed structure is Co.

6. The magnetic recording medium according to claim 1, wherein a protective layer is on the exchange coupling layer.

7. The magnetic recording medium according to claim 1, wherein a dose in the ion irradiation is in the range of $1 \times 10^{13}$ to $1 \times 10^{15}$ (ions/cm$^2$).

* * * * *